(12) United States Patent
Mukerji

(10) Patent No.: US 7,953,838 B1
(45) Date of Patent: *May 31, 2011

(54) TCP-OVER-TCP USING MULTIPLE TCP STREAMS

(75) Inventor: Arindum Mukerji, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 155 days.

This patent is subject to a terminal disclaimer.

(21) Appl. No.: 12/355,518

(22) Filed: Jan. 16, 2009

Related U.S. Application Data

(63) Continuation of application No. 11/618,620, filed on Dec. 29, 2006, now Pat. No. 7,493,383.

(51) Int. Cl.
*G06F 15/173* (2006.01)
(52) U.S. Cl. ......... 709/223; 709/224; 709/235; 709/239
(58) Field of Classification Search .......... 709/223–224, 709/232, 235, 227–228, 238–239
See application file for complete search history.

(56) References Cited

U.S. PATENT DOCUMENTS

| 6,542,934 | B1 * | 4/2003 | Bader et al. ............... | 709/239 |
| 6,665,273 | B1 * | 12/2003 | Goguen et al. ............. | 370/252 |
| 6,947,379 | B1 | 9/2005 | Gleichauf et al. | |
| 6,981,014 | B2 | 12/2005 | Jayam et al. | |
| 7,046,669 | B1 | 5/2006 | Mauger et al. | |
| 7,123,587 | B1 * | 10/2006 | Hass et al. ................. | 370/238 |
| 7,286,476 | B2 | 10/2007 | Helmy et al. | |
| 7,710,869 | B1 * | 5/2010 | Gleichauf et al. .......... | 370/229 |
| 2002/0010866 | A1 * | 1/2002 | McCullough et al. ...... | 709/228 |
| 2003/0063560 | A1 | 4/2003 | Jenq et al. | |
| 2003/0065817 | A1 | 4/2003 | Benchetrit et al. | |
| 2004/0015591 | A1 | 1/2004 | Wang | |
| 2004/0165581 | A1 | 8/2004 | Oogushi | |
| 2005/0055577 | A1 | 3/2005 | Wesemann et al. | |
| 2005/0144321 | A1 | 6/2005 | Forsberg | |
| 2005/0157641 | A1 | 7/2005 | Roy | |
| 2006/0002292 | A1 | 1/2006 | Chang et al. | |
| 2006/0034251 | A1 | 2/2006 | Sivabalan et al. | |
| 2007/0183317 | A1 * | 8/2007 | Vasseur et al. ............. | 370/225 |

OTHER PUBLICATIONS

"Transmission Control Protocol—DARPA Internet Program Protocol Specification", Sep. 1981, pp. 1-91, Information Sciences Institute, Marina del Rey, California, http://tools.ietf.org/html/rfc793 (accessed May 14, 2007).
Ramakrishnan, et al., "The Addition of Explicit Congestion Notification (ECN) to IP", Sep. 2001, pp. 1-49, Network Working Group, http://www.apps.ietf.org/rfc/rfc3168.html (accessed May 14, 2007).
Stevens, "TCP Slow Start, Congestion Avoidance, Fast Retransmit, and Fast Recovery Algorithms", Jan. 1997, pp. 1-5, Network Working Group, http://www.apps.ietf.org/rfc/rfc2001.html (accessed May 14, 2007).
Honda, Osamu et al., "Understanding TCP over TCP: Effects of TCP Tunneling on End-to-End Throughput and Latency," www.ispl.jp/~oosaki/papers/Honda05_ITcom.pdf (accessed Jul. 9, 2007).
Dierks, T et al., "The TLS Protocol", Jan. 1999, 75 pgs, Network Working Group, http://www.ietf.org/rfc/rfc2246.txt (accessed Jul. 9, 2007).
Lee et al., "TCP Tunnels: Avoiding Congestions Collapse," IEEE 2000.

* cited by examiner

*Primary Examiner* — Philip B Tran
(74) *Attorney, Agent, or Firm* — Frommer Lawrence & Haug LLP; Jamie L. Wiegand

(57) ABSTRACT

A system, apparatus, and method for managing TCP over TCP communications using multiple TCP network connections. A plurality of tunneled network connections may be established between network devices. The network devices may employ one of the tunneled network connections over which to establish a plurality of application sessions. If congestion is detected on the employed tunneled network connection that exceeds a threshold, then a reset flag may be sent to abort that tunneled network connection. At least some of the application sessions are also transferred to another one of plurality of tunneled network connections, without terminating the moved application sessions. In one embodiment, at least one more tunneled network connection may be established between the network devices.

20 Claims, 5 Drawing Sheets

TCP-OVER-TCP USING MULTIPLE TCP STREAMS

CROSS-REFERENCE TO RELATED APPLICATION

This utility patent application is a continuation U.S. patent application Ser. No. 11/618,620 filed on Dec. 29, 2006, and entitled "TCP-OVER-TCP Using Multiple TCP Streams," the benefit of which is claimed under 35 U.S.C. §120, and which is incorporated by reference herein in its entirety.

BACKGROUND OF THE INVENTION

This invention relates generally to network communications, and more particularly but not exclusively, to managing network communications for TCP over TCP traffic using multiple TCP connections between communicating network devices.

Transmission Control Protocol (TCP) is one of the protocols within the Internet protocol set of network communication protocols on which many of today's networks run. Applications on network devices may employ TCP to create connections with each other and exchange data using network packets. TCP protocol is known as a connection-oriented protocol that was designed to guarantee reliable, in-order delivery of data.

TCP devices package the data into streams of bytes called segments which may be sent as individual IP datagrams. TCP checks to make sure that no packets are lost by giving each segment a sequence number which numbers the bytes in the stream, and an acknowledgement number which tells a receiving network device the next expected sequence number, from which the last received sequence number may be intuited. Indirectly, the acknowledgement number tells the sending network device if a segment is lost, by noting whether an acknowledgement for a sent segment is received by the sending network device within a defined amount of time. This time period is typically referred to as a retransmission time out period (RTO). Thus, if a segment is determined to be lost, the sending device may retransmit that segment after the RTO expires, or sooner based on certain optional recovery mechanisms.

Over the Internet, however, parameters such as bandwidth, latency, jitter, and loss rate may vary vastly from one connection to another or even change over time for a single connection. Thus, a fixed timeout for determining whether a packet is lost may be inappropriate. In fact, selection of a fixed timeout might result in inappropriately sending more packets than necessary, thereby increasing congestion over a network, and leading to an effect sometimes known as "meltdown." Therefore, TCP uses an adaptive timeout for determining packet loss and whether to retransmit a packet. Several such congestion avoidance algorithms are described in Request for Comments (RFC) 2001, which is available through the Internet Engineering Task Force (IETF). A typical implementation might start with a conservative timeout estimate, and when a segment is not acknowledged within this timeout estimate, increases the timeout and reduces the estimate of available network capacity (via "the congestion window") for subsequent segments.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE INVENTION

Figure 1:
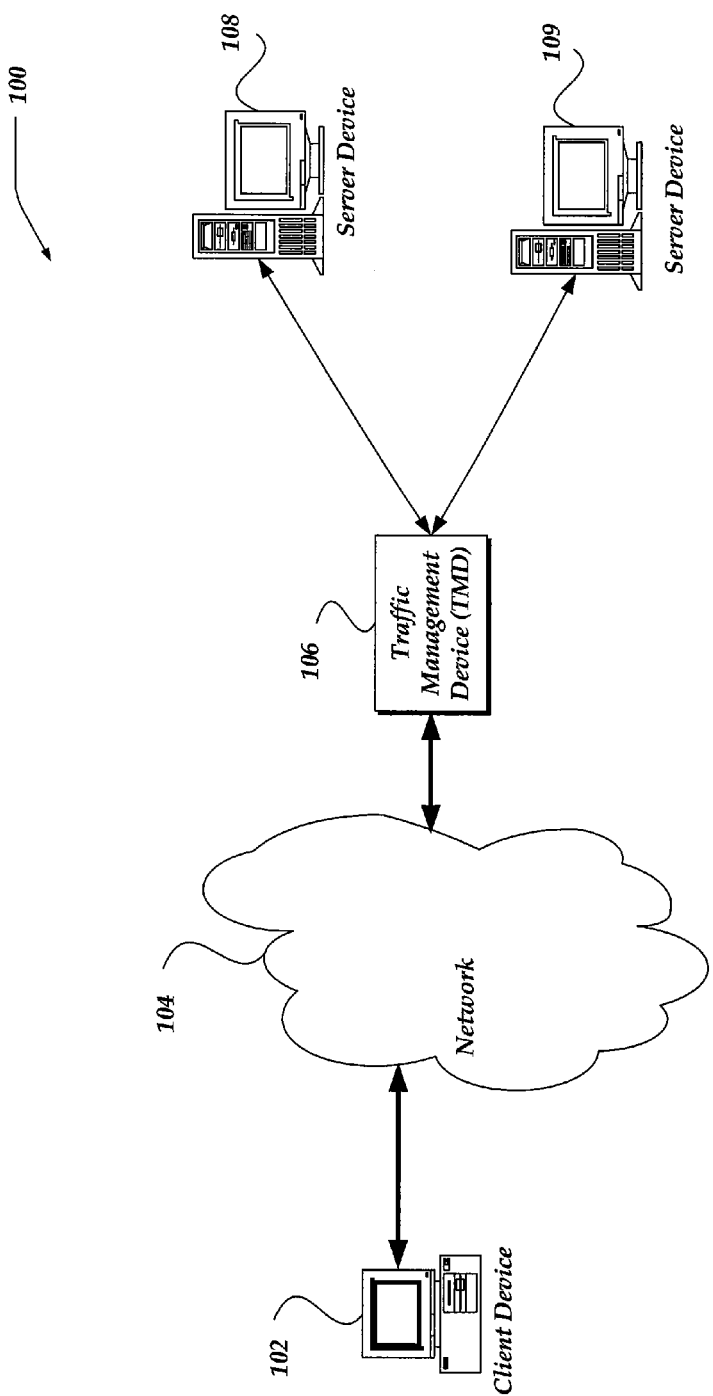
FIG. 1 shows a functional block diagram illustrating one embodiment of an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, a "tunnel" or "tunneled connection" is a network mechanism that provides for the encapsulation of network packets or frames at a same or lower layer protocol of the Open Systems Interconnection (OSI) network stack. Tunneling may be employed to take packets or frames from one network system and place (or encapsulate) them inside of frames from another network system. In one embodiment, tunneling may aggregate flows (e.g., sequences of packets with a same source/destination IP address and port number)

between two network devices and transfer them as a single TCP connection. Examples of tunneling protocols include, but are not limited to IP tunneling, L2TP, PPP, PPTP, VPNs, IPSec, GRE, MBone, SSL and TLS.

As used herein a "network connection" is a collection of links and/or software elements that enable a computing device to communicate with another computing device over a network. One such network connection may be a TCP connection. TCP connections are virtual connections between two network nodes, and are typically established through a TCP handshake protocol. The TCP protocol is described in more detail in RFC 793, which is available at through the IETF. A network connection "over" a particular path or link refers to a network connection that employs the specified path or link to establish and/or maintain a communication.

As further used herein, the term SSL connection is directed towards secure virtual connections between network nodes that may be established using an SSL handshake protocol. An SSL connection may have a session ID associated with it that is used to identify the connection. An SSL connection can be terminated, and a new SSL connection established using the same session ID as the terminated connection. When this occurs, an SSL session that began with the first SSL connection may continue with a second SSL connection. Therefore, an SSL session can have one or more SSL connections associated with it. Moreover, an application running over an SSL connection may use the SSL session ID to identify and manage the session.

A version of the SSL protocol is described in Netscape Communications Corp, *Secure Sockets Layer (SSL) version 3*, (November 1996). The TLS protocol is derived from SSL, and is described in Dierks, T., and Allen, C., "The TLS Protocol Version 1.0," RFC 2246 (January 1999), available through the IETF. As used throughout this application, including the claims, SSL refers to SSL, TLS, and all secure communications protocols derived therefrom.

As used herein an "application session" or "session" is a series of application interactions between two or more communication end points over a network that occur within a network connection. Several sessions can use the same network connection, and sessions may span multiple individual connections in parallel or in series.

In this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa.

TCP over TCP connections refers to stacking one TCP connection on top of another TCP connection, such as might occur when running SLIP over TCP, PPP over SSH, or other TCP tunneling approaches. In such situations, the upper and lower layer TCP connections may have different RTO timers. These RTO timers may also be used to manage congestion control. When a connection such as this experiences packet-loss, the lower layer TCP may queue up a retransmission and reduce its estimate of available network capacity, assuming that there is congestion on the network that is causing the packet loss. Since the connection may be blocked for this amount of time, the upper layer TCP, which may include the actual data, will not receive a timely acknowledgement, and may also queue a retransmission. However, the RTO for the upper layer may be less than the lower layer RTO. Thus, the upper layer TCP will queue up retransmissions more quickly than the lower layer can process them. This may make the upper layer TCP connection stall very quickly, with subsequent retransmissions eventually causing an internal meltdown effect. Similarly, if the RTO for the upper layer is greater than the lower layer, more retransmissions of duplicate, unnecessary segments will be received, again overwhelming and confusing the upper layer TCP.

In addition, the upper layer TCP may not see actual packet loss due to the lower layer TCP's retransmissions. Therefore, in many circumstances, the upper layer TCP may retransmit after the lower layer RTO, but then receive an acknowledgement for an original packet it sent, perhaps due to actions by the lower layer TCP, such as having retransmitted and/or queing the packet. In some conditions, the upper layer TCP will then interpret this as an error in retransmissions, and will revert the reduction of its congestion window, causing it to overwhelm the lower layer TCP even more, which has duly reduced its congestion window due to it having experienced packet loss. Thus, in any of these situations, TCP's congestion control mechanisms for the upper layer TCP can not operate to reduce the congestion that will result.

Additionally, 'head of line blocking' may arise in TCP connections. The TCP protocol expects not only that packets not be missing or lost, but that segments be delivered in order, so that they may be reassembled by the receiving network device. Where a TCP connection includes streams of different application data with different priorities, head of line blocking might result in higher priority data being blocked while lower priority data is being serviced. Such head of line blocking may result in jolts, fits, and even transmission halts over the network, further worsening network traffic flow for TCP over TCP connections.

Briefly stated, a system, apparatus, and method is disclosed for managing TCP over TCP communications between network devices, which is directed towards addressing the network congestion issues noted above, in addition to providing other utility. Initially, a request from a first network device for a network resource is received by a second network device. In response, a first tunneled network connection is established between the first and second network devices. In addition, a plurality of additional tunneled network connections are also established between the first and second network devices. In one embodiment, the plurality of additional tunneled network connections may remain 'idle,' but alive, by sending keep alive network packets, or the like. The network devices may then employ the first tunneled network connection to communicate between them a plurality of application data session streams over the network. If congestion is detected on the first tunneled network connection that exceeds a threshold, then a packet with a reset flag may be sent to abort the first tunneled network connection. The reset flag is directed towards forcing packet loss to be detected for each application data session stream within the first tunneled network connection. In addition, at least one more tunneled network connection may be established between the first and second network devices. In one embodiment, the establishment of the at least one more tunneled network connection is performed during sending of the reset flag. However, the invention is not constrained to sending of a reset flag, and other mechanisms may be employed. For example, an in-band message having out-of-band TCP data semantics, such as an urgent (URG) flag, might be employed, or some other out-of-band mechanism, or the like. Furthermore, the network devices are configured to move the communications of at least some of the application data session streams to one of the plurality of additional tunneled network connections, without terminating the moved application data sessions.

Illustrative Operating Environment

FIG. 1 illustrates one embodiment of an environment in which the invention may operate. However, not all of these components may be required to practice the invention, and variations in the arrangement and type of the components may be made without departing from the spirit or scope of the invention.

As shown in the figure, system 100 includes client device 102, network 104, traffic management device (TMD) 106, and servers 108-109. Client device 102 is in communication with TMD 106 through network 104. TMD 106 is in further communication with servers 108-109. Although not shown, TMD 106 may be in communication with servers 108-109 through a network infrastructure that is similar to network 104.

One embodiment of client device 102 is described in more detail below in conjunction with FIG. 2 (where it is depicted as client device 200). With continued reference to FIG. 1, generally, however, client device 102 may include virtually any computing device capable of connecting to another computing device to send and receive information, including web requests for information from a server, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device. Similarly, client device 102 may be any device that is capable of connecting using a wired or wireless communication medium such as a PDA, POCKET PC, wearable computer, and any other device that is equipped to communicate over a wired and/or wireless communication medium.

Client device 102 may further include a client application that is configured to manage various actions. For example, client device 102 may include a web browser application, that is configured to enable an end-user to interact with other devices and/or applications over network 104. In addition, client device 102 may employ a variety of other client applications to communicate with other devices over network 104, including, but not limited to Voice Over Internet Protocol (VOIP), Instant Messaging (IM), Short Message Service (SMS), or the like. Thus, client device 102 may employ a variety of mechanisms to establish network sessions with another computing device. In one embodiment, client device 102 may employ a plurality of network sessions over at least one secure network connection with another computing device, such as TMD 106, servers 108-109, or the like.

Client device 102 may communicate with network 104 employing a variety of network interfaces and associated communication protocols. Client device 102 may, for example, use various mechanisms such as Serial Line IP (SLIP) protocol, Point to Point Protocol (PPP), Digital Subscriber Line (DSL), Integrated Services Digital Network (ISDN), as well as any of a variety of wireless networking protocols.

Network 104 is configured to couple client device 102, with other network devices, such as TMD 106. Network 104 is enabled to employ any form of computer readable media for communicating information from one electronic device to another. In one embodiment, network 104 is the Internet, and may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 104 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for network devices, such as client device 102, and the like, with various degrees of mobility. For example, network 104 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 104 includes any communication method by which information may travel between client device 102 and TMD 106.

Additionally, network 104 may include communication media that typically embodies computer-readable instructions, data structures, program modules, or other transport mechanism and includes any information delivery media. By way of example, communication media includes wired media such as, but not limited to, twisted pair, coaxial cable, fiber optics, wave guides, and other wired media and wireless media such as, but not limited to, acoustic, RF, infrared, and other wireless media. Moreover, in one embodiment, network 104 may employ a modulated data signal such as a carrier wave, data signal, or the like. The terms "modulated data signal," and "carrier wave signal" refer to a signal that has one or more of its characteristics set or changed in such a manner as to encode information, instructions, data, or the like, in the signal.

TMD 106 includes virtually any device that manages network traffic. Such devices include, for example, routers, proxies, firewalls, load balancers, cache devices, devices that perform network address translation, any combination of the preceding devices, and the like. TMD 106 may, for example, control the flow of data packets delivered to and forwarded from an array of servers, such as servers 108-109. TMD 106 may direct a request for a resource to a particular server based on network traffic, network topology, capacity of a server, content requested, and a host of other traffic distribution mechanisms. TMD 106 may receive data packets from and transmit data packets to the Internet, an intranet, or a local area network accessible through another network. TMD 106 may recognize packets that are part of the same communication, flow, and/or stream and may perform special processing on such packets, such as directing them to the same server so that state information is maintained. TMD 106 also may support a wide variety of network applications such as Web browsing, email, telephony, streaming multimedia and other traffic that is sent in packets, VOIP, or the like Moreover, TMD 106 may establish one or more network connections with various computing devices, including servers 108-109, and/or client device 102. In at least one embodiment, at least one of the network connections may comprise a TCP over TCP network connection.

TMD 106 may receive requests from client device 102. TMD 106 may select a server from servers 108-109 to forward the request. TMD 106 may employ any of a variety of criteria and mechanisms to select the server, including those mentioned above, load balancing mechanisms, and the like. TMD 106 may receive a response to the request and forward the response to client device 102.

In one embodiment, client 102 may request a tunneled network connection with TMD 106, to send and/or receive requests and/or responses. TMD 106 and/or client 102 may, in one embodiment, further establish a plurality of other tunneled network connections between them. In one embodiment, the number of established tunneled network connections may be between two and eighty; however, the invention is not so limited, and any of a number of other tunneled network connections may be established. In one embodiment, TMD 106 may determine a number of tunneled network connections to establish with client 102 based on information about packet loss over a first network connection with client 102, a packet loss history with client 102, a type of data being communicated with client 102, a protocol associated with a session with client 102, or any of a variety of other network metrics, including loads on a network, a characteristic of the network, including a speed of the network, or the like. In one embodiment, a selected tunneled network connection from the plurality of tunneled network connections may be used to establish two or more secure sessions between client device 102 and TMD 106. In one embodiment, the 'unused' other tunneled network connections may be maintained by sending acknowledgment and/or 'keep alive' messages between client device 102 and TMD 106.

TMD 106 may monitor various network connection characteristics of at least the selected tunneled network connection and based on the monitored characteristics, perform actions that abort the selected tunneled network connection if it is determined that congestion is above a determined threshold value. TMD 106 may, for example, monitor a measurement of a packet loss, a status of a send queue, a network load metric, or the like. However, the invention is not limited to these metrics, and others may also be used to determine if the congestion is above a determined threshold value. By aborting the selected network connection, any sessions within the selected tunneled network connection will be identified by either TMD 106 and/or client 102 as still active, but having a packet loss. The active sessions may then be redirected by client 102 and/or TMD 106 to employ another of the plurality of selected tunneled network connections to maintain the active sessions. TMD 106 may employ a process substantially similar to that described below in conjunction with FIG. 5 to perform at least some of its actions.

TMD 106 may be implemented using one or more personal computers, servers, multiprocessor systems, microprocessor-based or programmable consumer electronics, network PCs, radio frequency (RF) devices, infrared (IR) devices, integrated devices combining one or more of the preceding devices, and the like. Such devices may be implemented solely in hardware or in hardware and software. For example, such devices may include some application specific integrated circuits (ASICs) coupled to one or more microprocessors. The ASICs may be used to provide a high-speed switch fabric while the microprocessors may perform higher layer processing of packets. An embodiment of a network device that could be used as TMD 106 is network device 200 of FIG. 2, configured with appropriate software. The BIG-IP Traffic Manager and the 3-DNS Controller by F5 Networks, Inc., are examples of TMDs.

Servers 108-109 may include any computing device capable of communicating packets with client computer 102. Each packet may convey a piece of information. A packet may be sent for handshaking, i.e., to establish a connection or to acknowledge receipt of data. The packet may include information such as a request, a response, or the like. Generally, packets received by servers 108-109 will be formatted according to TCP/IP, but they could also be formatted using another transport protocol, such as SCTP, X.25, NetBEUI, IPX/SPX, token ring, similar IPv4/6 protocols, and the like. Moreover, the packets may be communicated between servers 108-109, TMD 106, and client device 102 employing HTTP, HTTPS, and the like.

In one embodiment, servers 108-109 are configured to operate as a website server. However, servers 108-109 are not limited to web servers, and may also operate a messaging server, a File Transfer Protocol (FTP) server, a database server, content server, and the like. Additionally, each of servers 108-109 may be configured to perform a different operation. Thus, for example, back-end server 108 may be configured as a messaging server, while back-end server 109 is configured as a database server. Moreover, while servers 108-109 may operate as other than a website, they may still be enabled to receive an HTTP communication.

Devices that may operate as servers 108-109 include personal computers desktop computers, multiprocessor systems, microprocessor-based or programmable consumer electronics, network PCs, servers, and the like.

Illustrative Client Device

Figure 2:
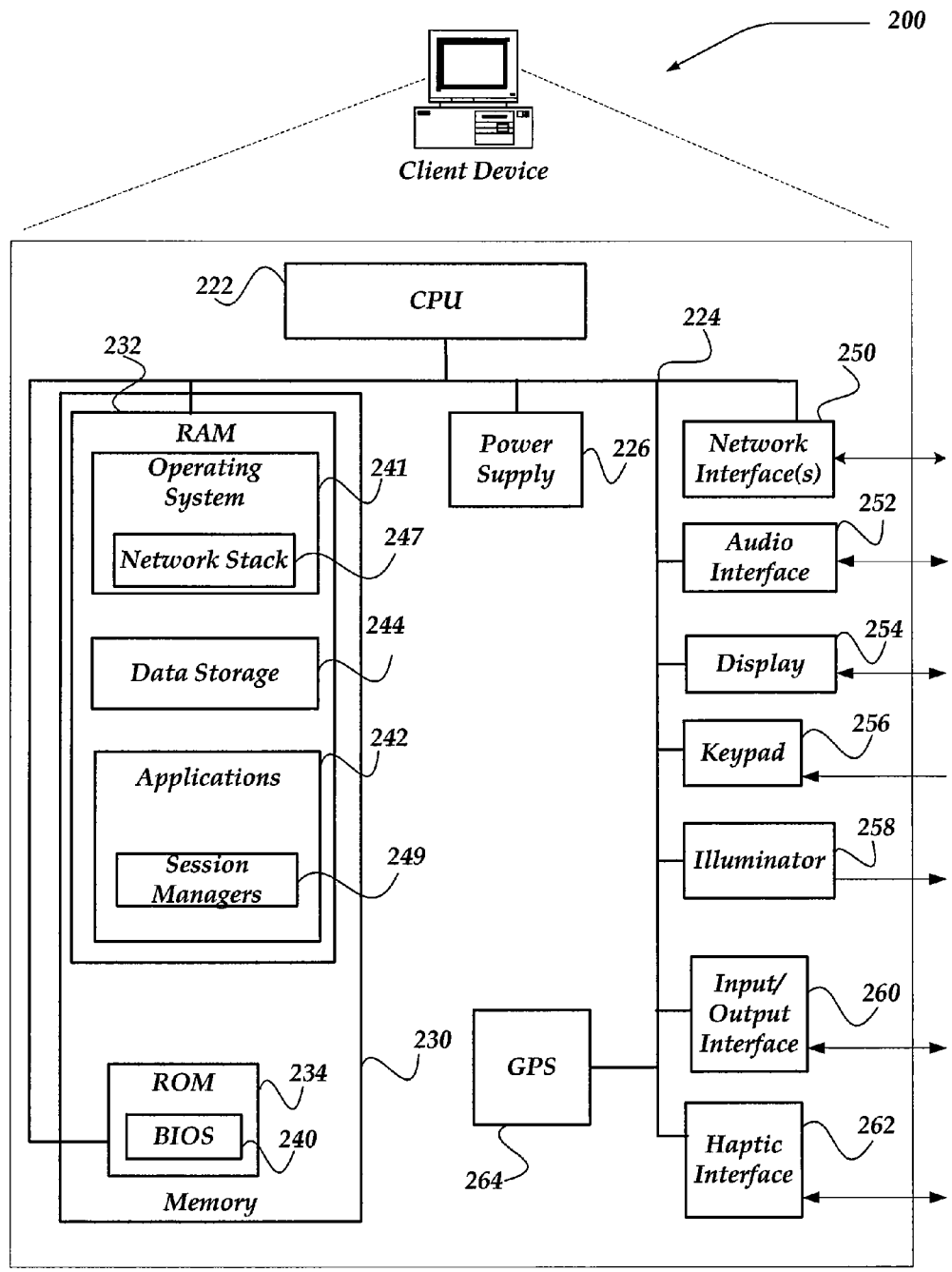
FIG. 2 shows one embodiment of a client device that may be included in a system implementing the invention.

FIG. 2 shows one embodiment of client device 200 that may be included in a system implementing the invention. Client device 200 represents one embodiment of an implementation of client device 102 of FIG. 1.

Generally, client device 200 may comprise any personal electronic device. Oftentimes, electronic devices will be capable of personal communication by connecting to one or more wired and/or wireless networks, connecting to multiple nodes of a single wired and/or wireless network, communicating over one or more channels to one or more networks, or otherwise engaging in one or more communication sessions. Client device 200 may, for example, comprise electronic devices such as Personal Digital Assistants (PDAs), handheld computers, personal computers, multiprocessor systems, microprocessor-based or programmable consumer electronics, network PCs, wearable computers, or the like. Client device 200 may also comprise a server device.

Client device 200 may include many more or less components than those shown in FIG. 2. However, the components shown are sufficient to disclose an illustrative embodiment for practicing the present invention. As shown in the figure, client device 200 includes a processing unit 222 in communication with a mass memory 230 via a bus 224.

Client device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or the like. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Operating system 241 may also include network stack 247. Network stack 247 represents a suite of components that enable various networking communications. Network stack 247 is sometimes known as a TCP/IP stack, a TCP/IP protocol suite, or a networking protocol stack. Network stack 247 is configured to manage various networking communication protocols within layers 3 and 4 (e.g., the network layer, and the transport layer) of the seven-layer protocol stack as defined by the ISO-OSI (International Standards Organization-Open Systems Interconnection) framework. For example, network stack 247 may include components configured to manage TCP, UDP, RTP, SCTP, SPX, ATP communications, or the like. Network stack 247 may also include components configured to manage IP, ICMP, ARP, PIPX, BGP, OSPF, RIP, IGRP, RARP, or X.25 communications, or the like. Moreover, network stack 247 may be configured to operate in conjunction with various security applications to enable client device 200 to request and/or establish one or more tunneled network connections with another computing device, including SLIP over TCP, PPP over SSH, or a variety of other TCP tunneling connection types and/or protcols, including L2TP, PPP, PPTP, VPNs, IPSec, GRE, MBone, SSL/TLS, or any of a variety of other TCP over TCP connections and/or protocols.

Memory 230 further includes one or more data storage 244, which can be utilized by client device 200 to store, among other things, applications 242 and/or other data. For example, data storage 244 may also be employed to store information that describes various capabilities of client device 200. The information may then be provided to another device based on any of a variety of events, including being sent as part of a header during a communication, sent upon request, or the like.

Applications 242 may include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, browsers, email clients, contact managers, task managers, transcoders, database programs, word processing programs, security applications, spreadsheet programs, games, and so forth. For example, shown in the figure are session managers 249. Session managers 249 includes various client applications that are configured to establish and maintain various network sessions, including IM sessions, email sessions, VOIP sessions, secure sessions, or the like, with another computing device. In one embodiment, session managers 249 may employ a selected tunneled network connection in which to communicate a plurality of tunneled sessions over a network. Should the selected tunneled network connection be aborted, or otherwise 'torn-down,' then session managers 249 may transition at least one of the plurality of tunneled sessions to another tunneled network connection, to maintain the at least one tunneled session as active. In one embodiment, the other tunneled network connection may have been kept alive through a variety of mechanisms, including keep alives, acknowledgements, or the like, but otherwise unused for active tunneled sessions.

Illustrative TMD Environment

Figure 3:
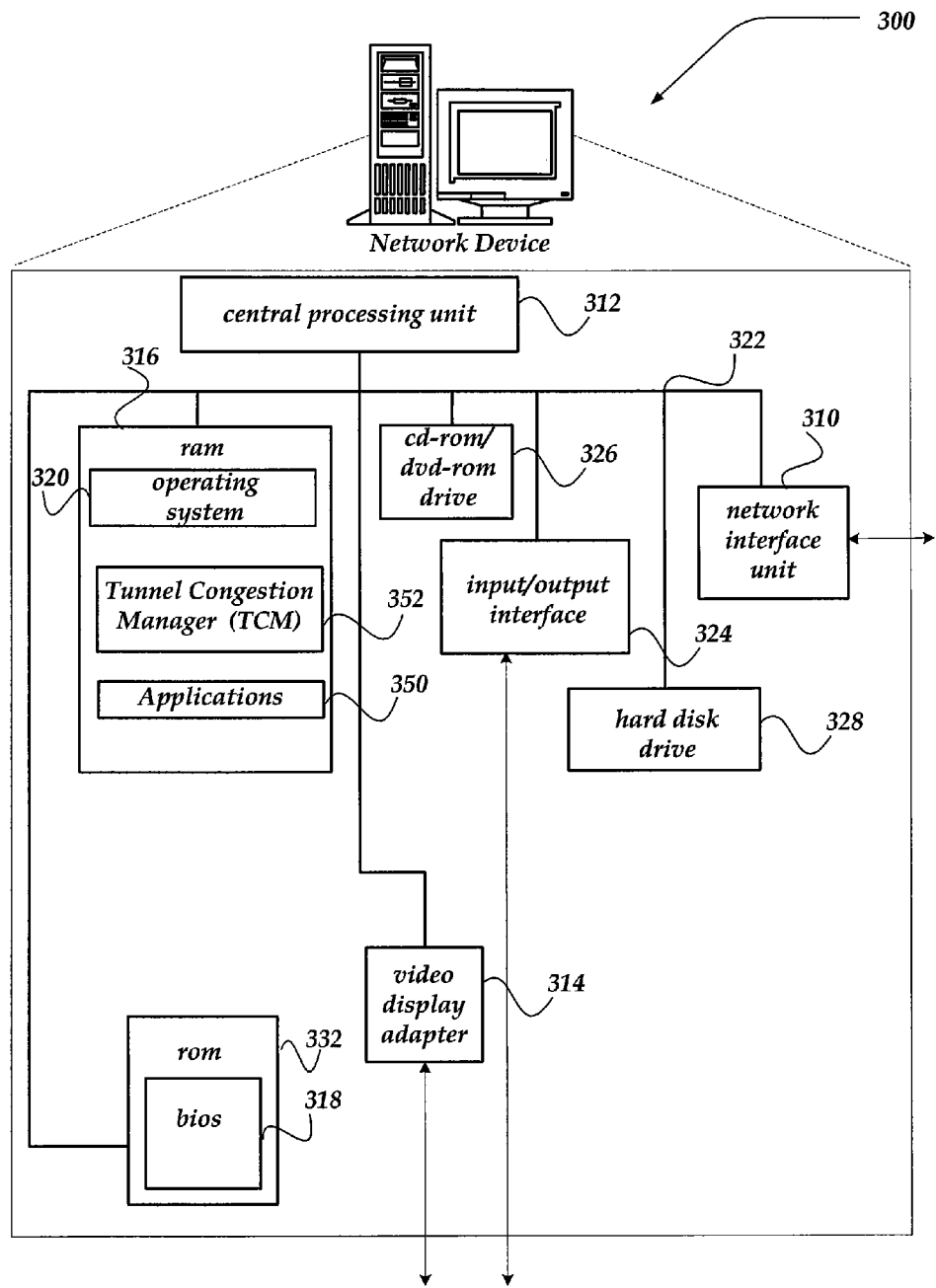
FIG. 3 shows a functional block diagram illustrating one embodiment of a network device that may be included in a system implementing the invention.

FIG. 3 shows one embodiment of a network device, according to one embodiment of the invention. Network device 300 may include many more or less components than those shown. The components shown, however, are sufficient to disclose an illustrative embodiment for practicing the invention. Network device 300 may represent, for example, TMD 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300.

As illustrated in FIG. 3, network device 300 also can communicate with the Internet, or some other communications network, such as network 104 in FIG. 1, via network interface unit 310, which is constructed for use with various communication protocols including the TCP/IP protocol. Network interface unit 310 is sometimes known as a transceiver, transceiving device, or network interface card (NIC).

Network device 300 may also include an SMTP handler application for transmitting and receiving e-mail, an HTTP handler application for receiving and handing HTTP requests, and an HTTPS handler application for handling secure connections. The HTTPS handler application may initiate communication with an external application in a secure fashion. Moreover, network device 300 may further include other applications that support virtually any secure connection, including TLS, TTLS, EAP, SSL, IPSec, and the like. Similarly, network device 300 may include applications that support a variety of tunneling mechanisms, such as VPN, PPP, L2TP, and so forth.

Network device 300 may also include input/output interface 324 for communicating with external devices, such as a mouse, keyboard, scanner, or other input devices not shown in FIG. 3. Likewise, network device 300 may further include additional mass storage facilities such as CD-ROM/DVD-ROM drive 326 and hard disk drive 328. Hard disk drive 328 may be utilized to store, among other things, application programs, databases, and the like.

In one embodiment, the network device 300 includes at least one Application Specific Integrated Circuit (ASIC) chip (not shown) coupled to bus 322. The ASIC chip can include logic that performs some of the actions of network device 300. For example, in one embodiment, the ASIC chip can perform a number of packet processing functions for incoming and/or outgoing packets. In one embodiment, the ASIC chip can perform at least a portion of the logic to enable the operation of traffic manager 352 and/or pipeline manager 354.

In one embodiment, network device 300 can further include one or more field-programmable gate arrays (FPGA) (not shown), instead of, or in addition to, the ASIC chip. A number of functions of the network device can be performed by the ASIC chip, the FPGA, by CPU 312 with instructions stored in memory, or by any combination of the ASIC chip, FPGA, and CPU.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include email programs, routing programs, schedulers, calendars, database programs, word processing programs, HTTP programs, traffic management programs, security programs, and so forth.

Operating system 320 may further include networking components (not shown) that enable network device to establish and maintain network connections with at least another computing device. As such operating system 320 may include various components to manage operations of the Open Systems Interconnection (OSI) network stack, including Internet Protocol (IP), TCP, UDP, SSL, HTTP, content encoding (content compression), and similar network related services. The network components may also monitor and determine network metrics, including, TCP maximum segment size (MSS), smoothed round trip time (RTT) for a connection, bandwidth delay product (BWDP), and the like, packet losses, characteristics of a network connection, including a network type, network speed, throughput capability, or the like. Operating system 320's networking components may also determine speeds of transmissions between an upper and a lower layer within a TCP over TCP network connection. In one embodiment, operating system 320's networking components may also determine whether packets are received out of order, as well as a variety of other networking metrics and characteristics.

In one embodiment, operating system 320's networking components may expose such network metrics/characteristics to tunnel congestion manager (TCM) 352. TCM 352 is configured to receive the network metrics, and similar network connection characteristics, and to make a congestion decision based, in part, on them. For example, in one embodiment, TCM 352 may determine a number of tunneled network connections to establish with another computing device based on such metrics/characteristics, packet losses, type of data being transmitted, or any of the above mentioned metrics/characteristics. In one embodiment, TCM 352 may employ one of a plurality of established tunneled network connections with the computing device to establish and communicate secure sessions, while maintaining the remainder of other plurality of established tunneled network connections alive, but unused for communicating sessions.

TCM 352 may monitor the network metrics/characteristics to determine whether congestion is detected on the employed tunneled network connection. In one embodiment, the determined threshold may be based on a combination of one or more of the network metrics/characteristics. In another embodiment, the threshold may include exceeding one or more thresholds on one or more network metrics/characteristics. In any event, if the congestion exceeds a determined threshold then TCM 352 may tear down the congested tunneled network connection and enable at least one of the active secure sessions to be transferred to another of the plurality of tunneled network connections. Moreover, TCM 352 may also enable additional tunneled network connections to be established. In this manner, as a tunneled network connection is torn down, new tunneled network connections may be established to 'roll over' the active sessions, while still maintaining the sessions as active during the transfers. TCM 352 may tear down a congested tunneled network connection using any of a variety of mechanisms, including for example, sending a RESET flag over the congested tunneled network connection. TCM 352 may employ a process substantially similar to that described below in conjunction with FIG. 5 to perform at least some of its actions.

FIGS. 4A-4D show one embodiment of a functional diagram illustrating rolling of multiple tunnel connections. As shown in the figures, a first network device 402 is in communication with a second network device 404. In one embodiment, first network device 402 may represent client device 102, while second network device 404 may represent TMD 106 of FIG. 1. However, the invention is not so limited, and other configurations, are envisaged by FIGS. 4A-4D, including, for example, a peer-to-peer networking configuration, or the like.

Figure 4A:
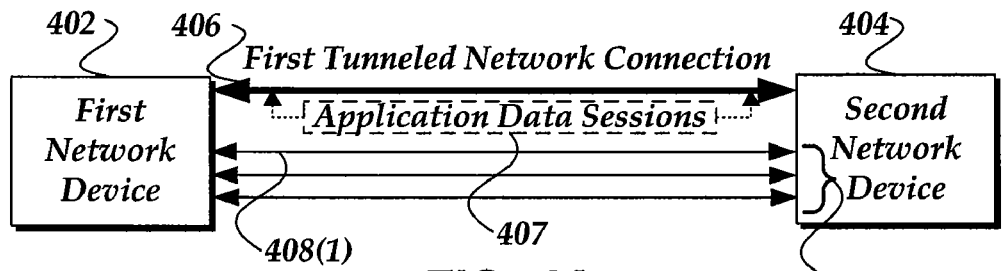
FIGS. 4A-4D show one embodiment of a functional diagram illustrating rolling of multiple tunnel connections.
Figure 4B:
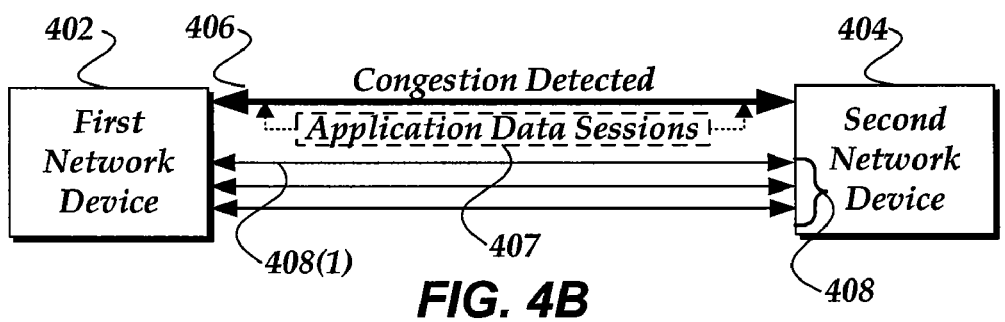

In any event, typically first network device 402 may send a request for a tunneled network connection 406 with second network device 404. In one embodiment, the tunneled network connection 406 may be a TCP over TCP connection using SSL/TLS, or any of a variety of other protocols, including those described above. Upon a determination, either first network device 402, and/or second network device 404 may initiate a request to establish a number of other, additional tunneled network connections 408. First network device 402 and second network device 404 may employ first tunneled network connection 406, or any other one of the tunneled network connections 408 to communicate a plurality of tunneled network application data sessions 407. As shown in FIG. 4A by way of example only, first tunneled network connection 406 is selected to communicate the plurality of tunneled network application data sessions 407. However, the invention is not so limited, and any of the plurality of tunneled network connections 406 or 408 may be employed.

Figure 4C:
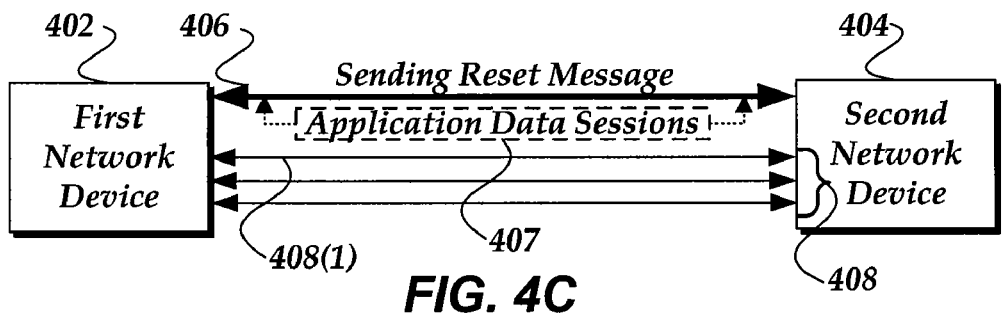
Figure 4D:
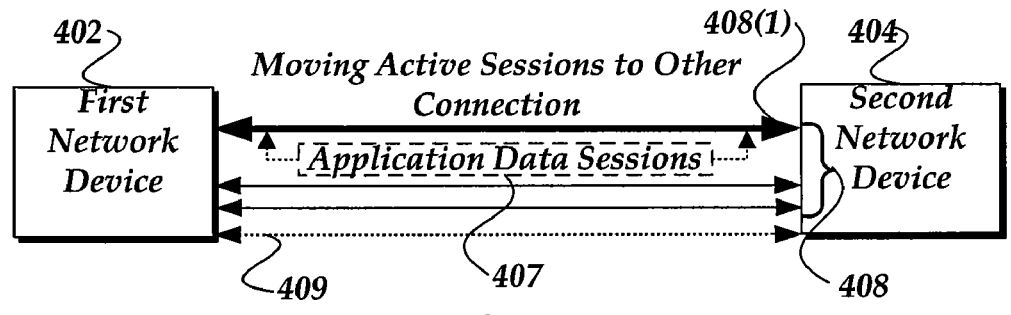

When congestion is detected to exceed a threshold (See FIG. 4B) on the selected tunneled network connection 406, a message, such as a RESET flag may be sent to abort or tear-down selected tunneled network connection 406 (See FIG. 4C). As shown in FIG. 4D, at least one of tunneled network application data sessions 407 is moved to one of the other of the plurality of tunneled network connections 408, such as tunneled network connection 408(1). Moreover, at least one new tunneled network connection 409 may also be established, as illustrated in FIG. 4D.

Figure 5:
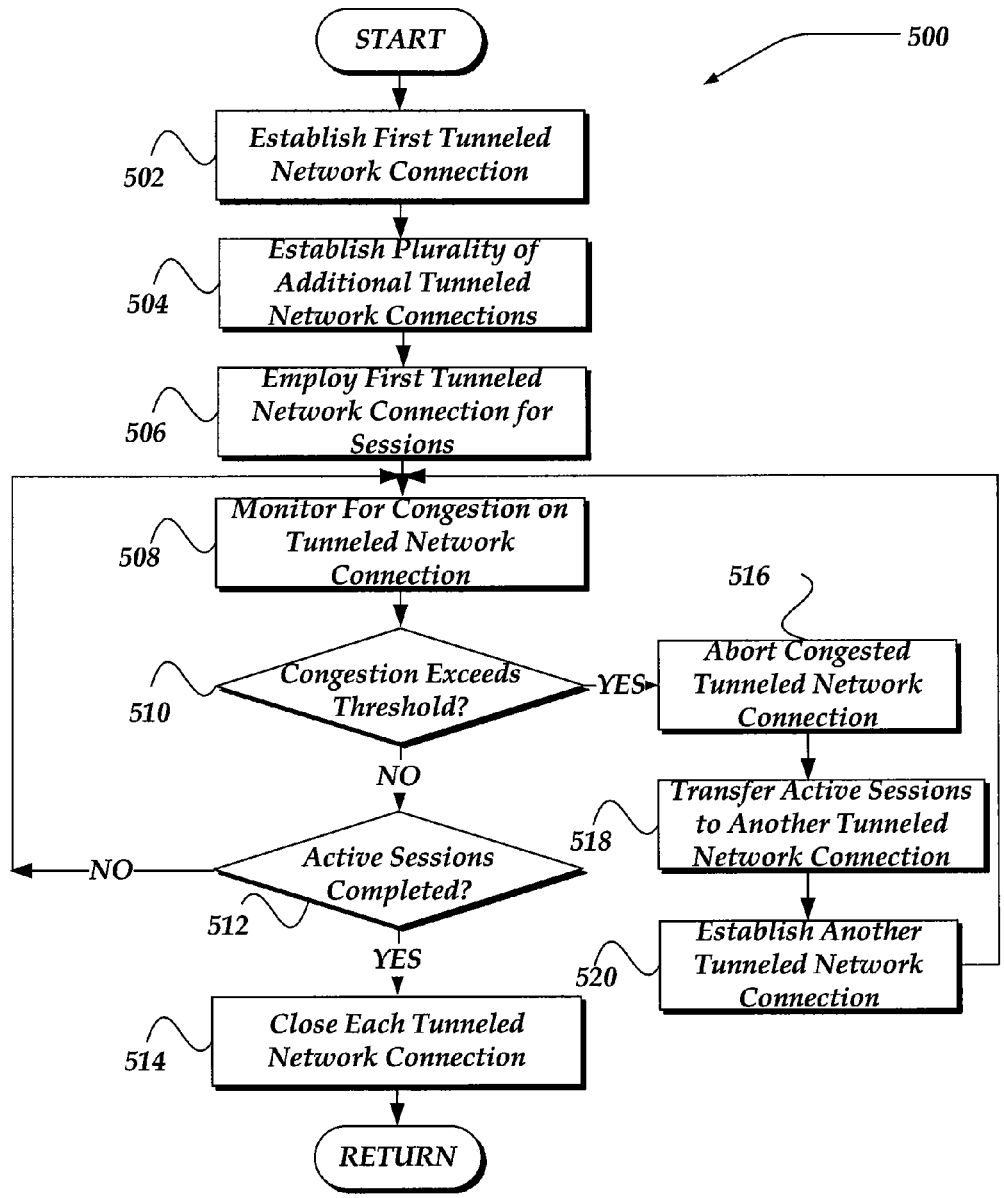
FIG. 5 illustrates a logical flow diagram generally showing one embodiment of an overview process for managing a network communications of using a plurality of tunneled connections, in accordance with embodiments of the invention.

FIG. 5 illustrates a logical flow diagram generally showing one embodiment of an overview process for managing a network communications of using a plurality of tunneled connections, with reference back to FIGS. 4A-4D for clarity.

As shown in FIG. 5, process 500 begins, after a start block, at block 502, where a first tunneled network connection is established. Processing then flows to block 504, where a plurality of additional tunneled network connections is also established. See FIG. 4A.

Process 500 continues next to block 506, where a tunneled network connection is selected and employed to communicate a plurality of secure network sessions. By employing a single tunneled network connection for the plurality of secure network sessions, efficient use of the bandwidth of the tunneled network connection may be made.

Processing next flows to block 508 where various network metrics/characteristics are monitored to determine whether a determination of congestion on the employed tunneled network connection exceeds a determined threshold. For example, in one embodiment, a send queue may be monitored, a measurement of packet loss may be evaluated, or the like. In another embodiment, congestion may also be determined, at least in part, based on a network load metric. Moreover, congestion may also be determined based on receiving at one of the first or the second network devices out of order packet segments, or a difference between a lower and an upper layer transmission speed associated with the first tunneled network connection, or the like. It should be noted therefore, that any of a variety of conditions may be employed to determine whether to transfer active application data sessions to another tunneled network connection, including, for example, network quality of service conditions.

In any event, processing moves to decision block 510, where such determination is evaluated. If the congestion is determined to exceed a determined threshold, then processing flows to block 516; otherwise, processing flows to decision block 512.

At block 516, the congested tunneled network connection is aborted. However, the invention is not limited to aborting of the congested tunneled network connection, and other mechanisms may be employed to initiate transfer of active application data sessions to another tunneled network connection. For example, a request to transfer message may be sent to over the congested tunneled network connection, or another tunneled network connection, or the like. In one embodiment, block 516 may be performed simultaneously with block 518. In one embodiment the tunneled network connection is aborted by sending a RESET flag over the congested tunneled network connection. Processing then flows to block 518, where at least one of the active secure network sessions are transferred to another tunneled network connection selected from the plurality of tunneled network connections. Processing continues to block 520, where at least one other tunneled network connection may be established. Processing then loops back to block 508, to continue monitoring and, if so determined, to roll over active secure network sessions to another tunneled network connection, while maintaining the secure network sessions rolled over, as active. By maintaining the secure network sessions as active while rolling them to another tunneled network connections, communications between the end-points may be maintained, thereby saving costs and time involved in re-establishing the sessions.

At decision block 512, a determination is made whether the data sessions are completed. Such determination may be made, for example, based on receiving a FIN message, or the like. In any event, if the data sessions are not completed, processing loops back to block 508; otherwise, if the data sessions are completed, processing flows to block 514, where each of the plurality of tunneled network connections are closed. Processing then returns to a calling process.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A non-transitory computer-readable storage device having computer-executable instructions for managing secure sessions over a network, the computer-executable instructions when installed onto a computing device enable the computing device to perform actions, comprising:
   establishing at least two network connections over the network between the computing device and another computing device;
   employing one of the at least two network connections to enable secure sessions between the computing device and the other computing device; and
   if network congestion is detected above a threshold on the employed network connection: redirecting at least one of the secure sessions to one of the other of the at least two network connections, such that the redirected secure sessions are maintained as active, while aborting the congested network connection.

2. The non-transitory computer-readable storage device of claim 1, wherein if congestion is detected further comprises: establishing at least one more network connection between the computing device and the other computing device.

3. The non-transitory computer-readable storage device of claim 1, wherein aborting the congested network connection further comprises sending a RESET flag over the congested network connection.

4. The non-transitory computer-readable storage device of claim 1, further comprising:
   if congestion is detected above the threshold on the other of the at least two networks:
   establishing at least one more network connection between the computing devices; and
   redirecting the secure sessions to one of the established one or more network connections, such that the redirected secure sessions are maintained as active.

5. The non-transitory computer-readable storage device of claim 4, wherein redirecting the secure sessions to one of the established one or more network connections, further comprises aborting the congested other of the at least two network connections.

6. The non-transitory computer-readable storage device of claim 4, wherein redirecting the secure sessions to one of the established one or more network connections, further comprises sending a request to transfer message to redirect the secure sessions.

7. The non-transitory computer-readable storage device of claim 1, wherein the secure sessions employ TCP over TCP communications between the computing devices.

8. An apparatus for managing a communication between computing devices over a network, comprising:
   a transceiver to send and receive secure data over the network;
   a processor configured to perform actions, comprising
   establishing a plurality of tunneled network connections with a computing device;
   employing a first tunneled network connection within the plurality of tunneled network connections over which to communicate at least two sessions; and
   based on a detection of a quality of service condition on the first tunneled network connection, transitioning at least one of the sessions to another of the plurality of tunneled network connections while maintaining the at least one session as active during the transition.

9. The apparatus of claim 8, wherein the processor is configured to perform actions, further comprising:
   transitioning the at least one of the sessions based on a detection of a network congestion on the first tunneled network connection, while maintaining the at least one session as active during the transition.

10. The apparatus of claim 8, wherein the processor is configured to perform actions, further comprising:
    establishing at least one more tunneled network connection with the computing device.

11. The apparatus of claim 8, wherein detecting a quality of service condition further comprises:
    monitoring for a packet loss over the employed tunneled network connection.

12. The apparatus of claim 8, wherein transitioning at least one of the sessions further comprises aborting the first tunneled network connection.

13. The apparatus of claim 8, wherein transitioning at least one of the sessions further comprises sending a request to transfer message to initiate the transition.

14. The apparatus of claim 8, wherein establishing the plurality of tunneled network connections further comprises maintaining currently unused network connections within the plurality as idle but alive, at least by sending keep alive network packets over each of the unused tunneled network connections in the plurality.

15. A traffic management device, comprising:
    a processor having:
    a secure communications module that establishes one or more alternate tunneled network connections, wherein the one or more established alternate tunneled network connections are configured to support at least one secure network communications between at least the traffic management device and another computing device communicating over a selected tunneled network connection; and
    an application data communication manager that is configured to move one or more active application data sessions from the selected tunneled network connection to the one or more alternate tunneled network connections when one or more adverse network conditions are detected on the selected tunneled network connection while maintaining the moved application data sessions as active.

16. The traffic management device of claim 15, wherein one or more adverse network conditions further comprises at least one of network congestion or a quality of service condition.

17. The traffic management device of claim 15, wherein the one or more alternate tunneled network connections are maintained as idle but alive at least until one or more active application data sessions are moved to the one or more alternate tunneled network connections.

18. The traffic management device of claim 15, wherein moving one or more active application data sessions further comprises sending a request to transfer message to initiate the move.

19. The traffic management device of claim 15, wherein moving one or more active application data sessions further comprises aborting the selected tunneled network connection.

20. The traffic management device of claim 19, wherein aborting the selecting tunneled network connection is performed by sending a message that includes an urgent (URG) flag set.

* * * * *

UNITED STATES PATENT AND TRADEMARK OFFICE
CERTIFICATE OF CORRECTION

| | |
|---|---|
| PATENT NO. | : 7,953,838 B1 |
| APPLICATION NO. | : 12/355518 |
| DATED | : May 31, 2011 |
| INVENTOR(S) | : Arindum Mukerji |

It is certified that error appears in the above-identified patent and that said Letters Patent is hereby corrected as shown below:

In column 4, line 13, delete "queing" and insert -- queuing --, therefor.

In column 6, line 20, delete "Mobil" and insert -- Mobile --, therefor.

In column 10, line 31, delete "protcols," and insert -- protocols, --, therefor.

In column 16, line 5, in Claim 8, delete "comprising" and insert -- comprising: --, therefor.

Signed and Sealed this
Third Day of January, 2012

David J. Kappos
*Director of the United States Patent and Trademark Office*